Figure 1:
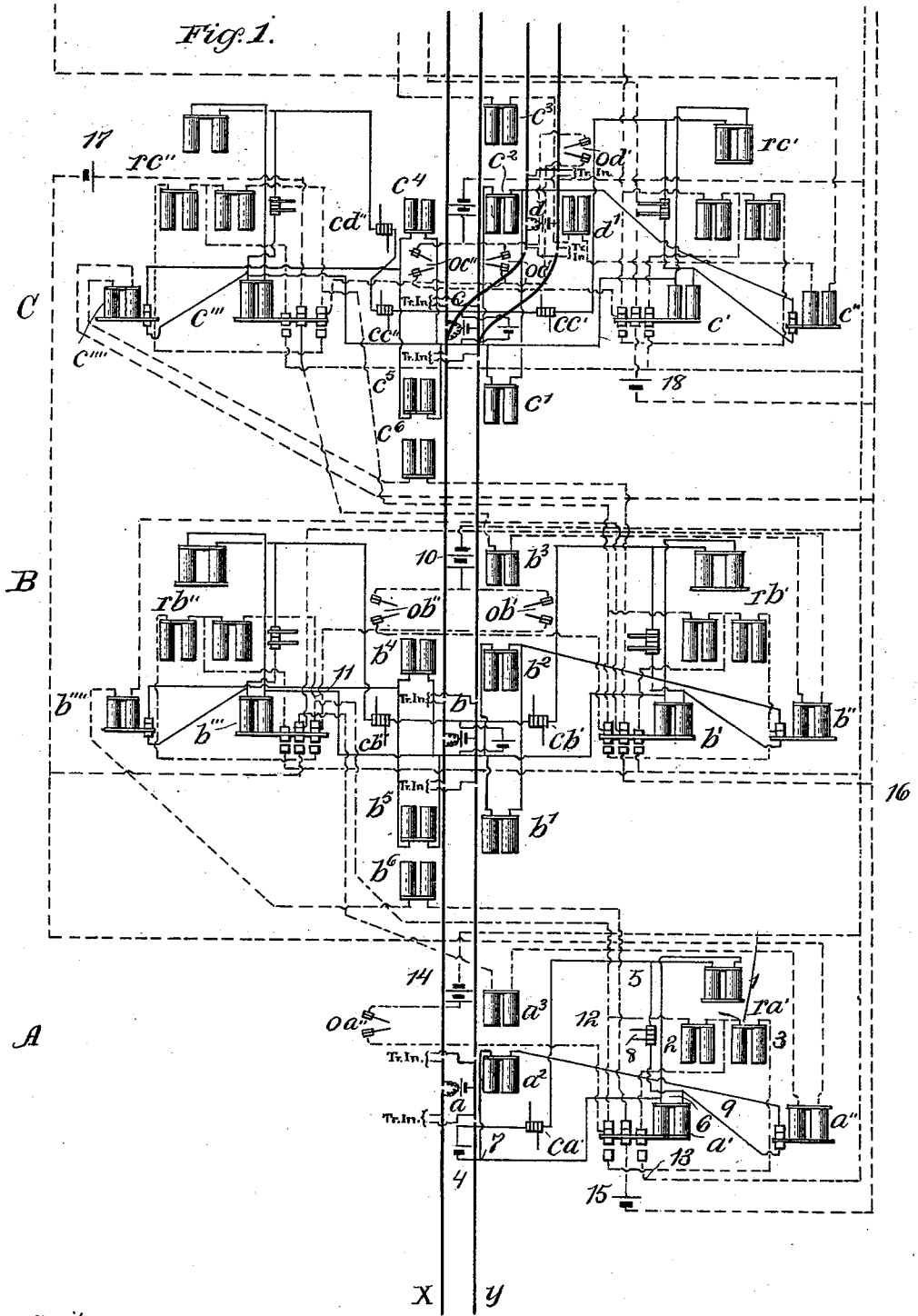

(No Model.)  6 Sheets—Sheet 1.
T. B. DIXON.
ELECTRICAL RAILWAY SIGNALING SYSTEM.
No. 543,595. Patented July 30, 1895.

Witnesses.
Victor J. Evans.
W. B. Dixon

Inventor.
T. B. Dixon.
By E. M. Marble & Sons
Attorneys.

(No Model.)

T. B. DIXON.
ELECTRICAL RAILWAY SIGNALING SYSTEM.

No. 543,595. Patented July 30, 1895.

Witnesses.
Victor J. Evans.
W. B. Dixon

Inventor.
T. B. Dixon.
By E. M. Marble & Sons
Attorneys (No Model.) 6 Sheets—Sheet 3.

T. B. DIXON.
ELECTRICAL RAILWAY SIGNALING SYSTEM.

No. 543,595. Patented July 30, 1895.

WITNESSES:

INVENTOR
Thomas B. Dixon
BY
ATTORNEYS (No Model.) 6 Sheets—Sheet 5.
T. B. DIXON.
ELECTRICAL RAILWAY SIGNALING SYSTEM.
No. 543,595. Patented July 30, 1895.

Witnesses:—

Inventor:—
Thomas B. Dixon
By E. M. Marble & Sons
His Attorneys (No Model.)  T. B. DIXON.  6 Sheets—Sheet 6.
ELECTRICAL RAILWAY SIGNALING SYSTEM.

No. 543,595.  Patented July 30, 1895.

Witnesses:—  Inventor:—

UNITED STATES PATENT OFFICE.

THOMAS B. DIXON, OF HENDERSON, KENTUCKY.

ELECTRICAL RAILWAY SIGNALING SYSTEM.

SPECIFICATION forming part of Letters Patent No. 543,595, dated July 30, 1895.

Application filed August 20, 1894. Serial No. 520,809. (No model.)

*To all whom it may concern:*

Be it known that I, THOMAS B. DIXON, a citizen of the United States, residing at Henderson, in the county of Henderson and State of Kentucky, have invented certain new and useful Improvements in Electrical Railway Signaling Systems; and I do hereby declare the following to be a full, clear, and exact description of the invention, such as will enable others skilled in the art to which it appertains to make and use the same.

My invention relates generally to automatic railway signal systems, and particularly to automatic electrically-operated signal systems, and to that class thereof wherein an automatic register or counter is used in connection with the signal-circuits, which registers each pair of wheels of a train as it enters the block, cancels the record so made of each wheel as it leaves the block, and automatically holds the signals of that block at "danger" so long as the register shows the presence of wheels on the block; and my invention consists in the novel and improved arrangement of circuits for accomplishing the results hereinafter specified.

I have filed an application for Letters Patent for an automatic electrical signaling system, November 17, 1892, Serial No. 452,358. The signal system described and claimed in the present application is an adaptation of the former system to use with an automatic wheel-register. The classes, operation, and arrangement of the signals in the two systems is therefore precisely the same, the differences between the two systems being in the means by which this operation is effected and controlled. The same governors and relays are used, though the arrangement of the contact-points of the governors is somewhat different.

In my system I divide the railway into blocks of convenient length, and it is designed that under ordinary circumstances but one train shall be in any block at any one time. To control the entrance of trains to the blocks, signals are placed at the entrances of the blocks. Circuits hereinafter described are provided for operating these signals. The circuits are operated by track-instruments placed at the entrances of the blocks, and the operation of the circuits is controlled also by automatic registers, likewise placed at or near the entrances of the blocks, and likewise operated by their respective track-instruments. These registers may be arranged to register the separate wheels, or pairs of wheels, of trains passing over the track, as units, or to register as units the separate trucks, cars, or the complete trains themselves; though ordinarily, and as particularly described in this specification, they will be arranged to register as units the several wheels, or rather the several pairs of wheels. Each register registers the wheels of a train passing into its block at the end at which it is situated, cancels the record so made as the wheels pass out of the block, whether at the one end thereof or at the other, and so controls the signal-circuits of the block that the signals of the block are prevented from going to "safety" so long as wheels remain on the block.

The objects of my invention are, first, to provide a registering system of signals which shall be capable of giving correct and unmistakable indication of the condition of the track at all times, and under all conditions of traffic; second, to so arrange the electrical connections that any accident to the circuits, by which they are rendered inoperative, shall of itself cause the signals to go to "danger" if at "safety," or to make it impossible to restore the signals to "safety," if at "danger," until the circuits shall have been placed in working order; third, to render it impossible for a signal to return to "safety" until the train which first set it to "danger" shall have passed completely out of the block which that signal protects, and to make it impossible, when a train has broken in two, for the passage of one part of the train out of the block to return the signals to "safety;" fourth, to provide for the canceling of the record of a train, whether it goes out of the block at the same end at which it entered or at the opposite end, or whether it divides within the block and the two parts leave the block separately, either at the same end of the block or at opposite ends; fifth, to make the system as cheap in installment and maintenance and as economical in the use of battery-power, as possible. These objects are attained in the system of signals herein described, and illustrated in the drawings, which accompany and form a part of this application, in which the same reference letters and numerals indicate the same or corresponding parts, and in which—

Figure 2:
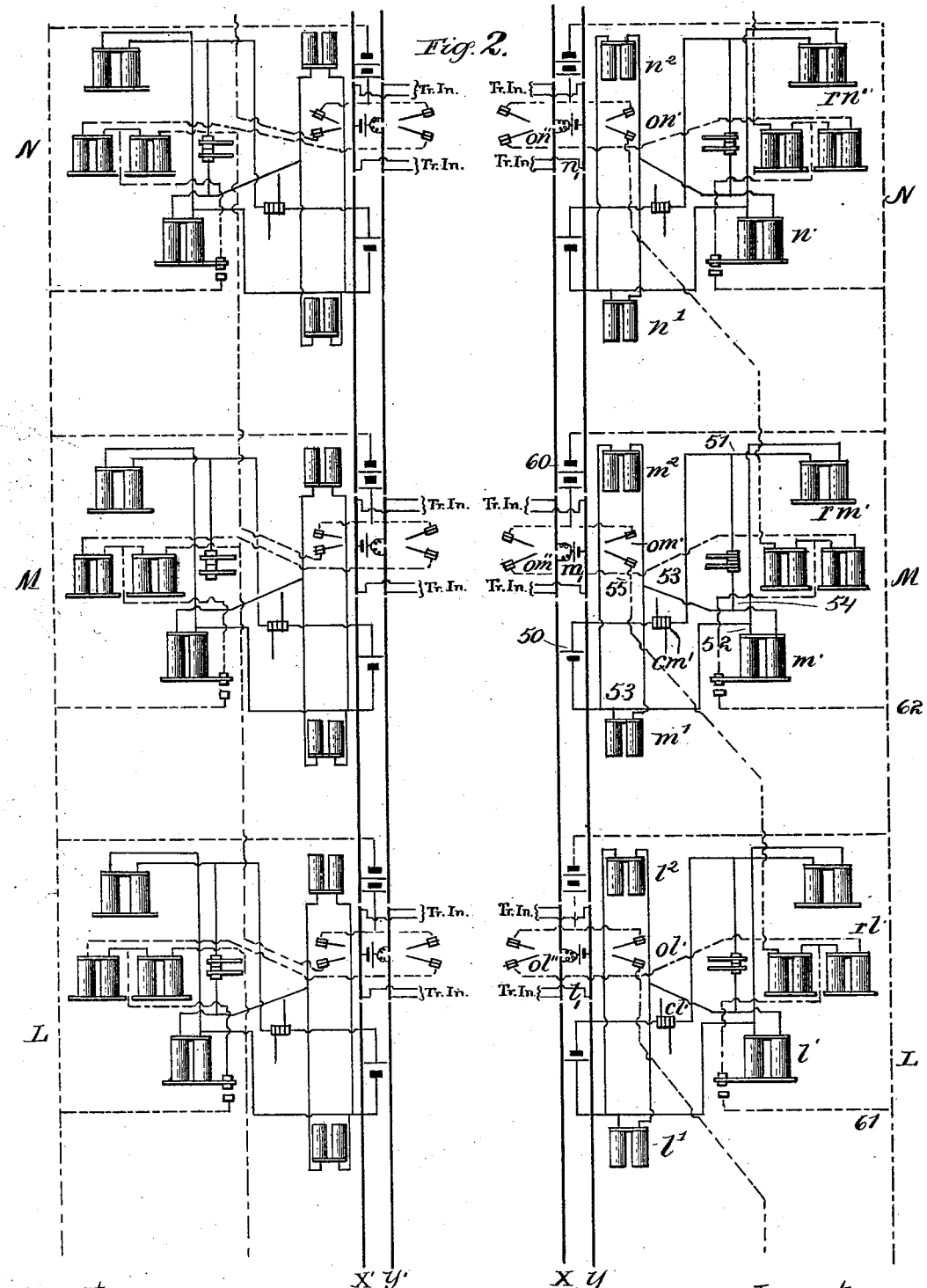
Figure 3:
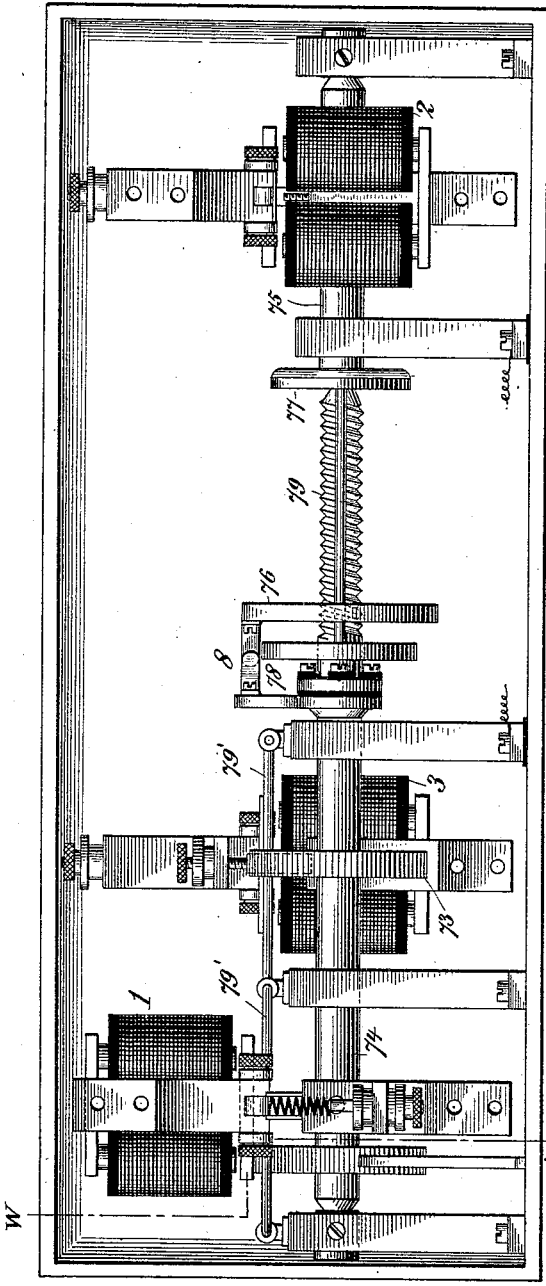
Figure 4:
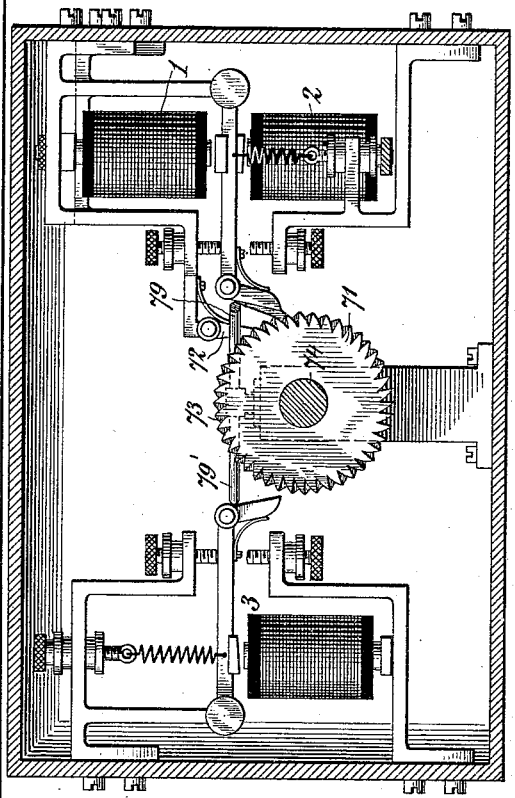
Figure 5:
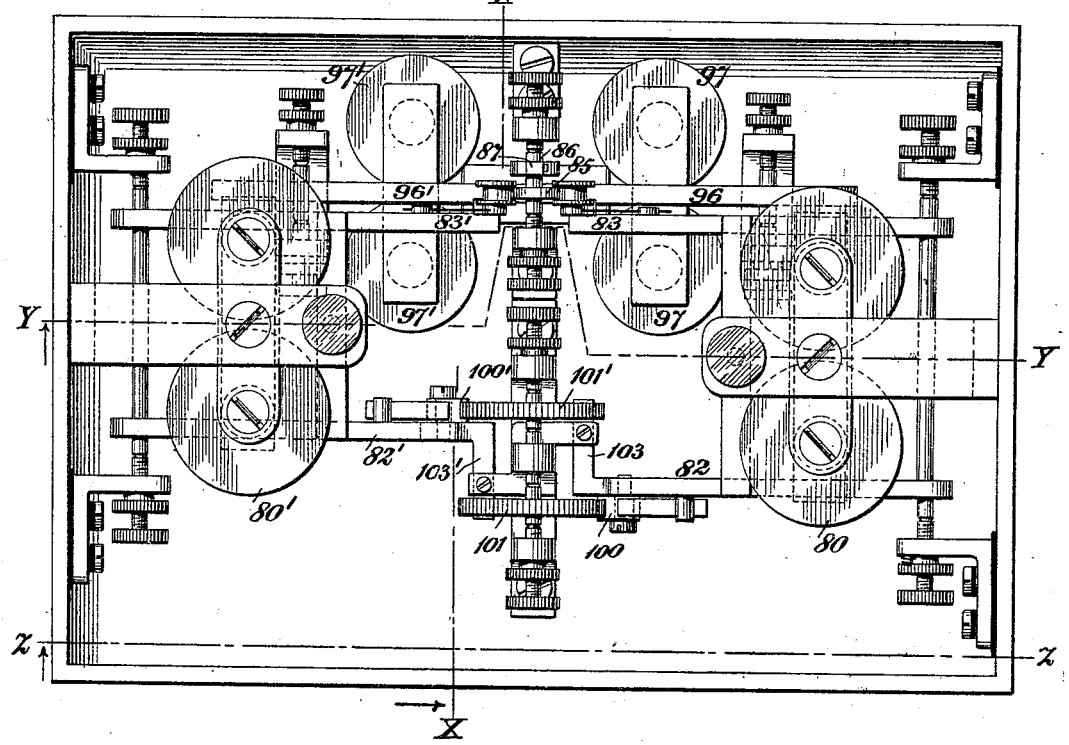
Figure 6:
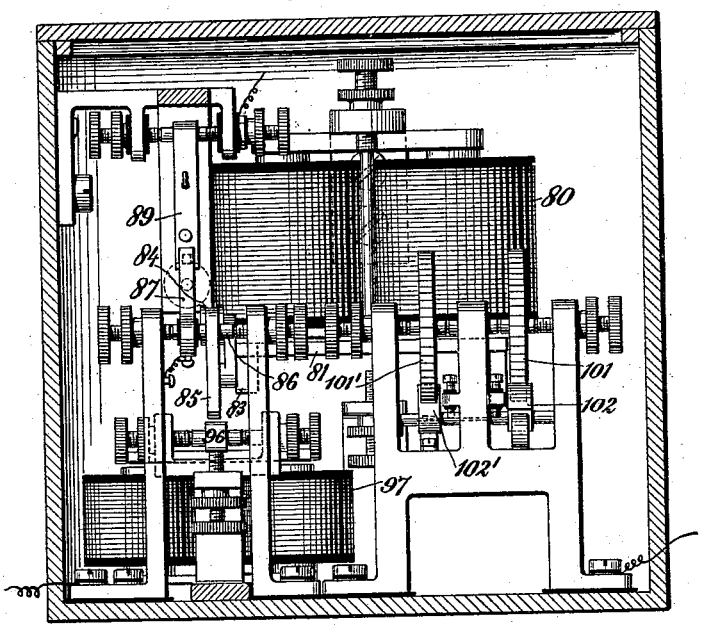
Figure 9:
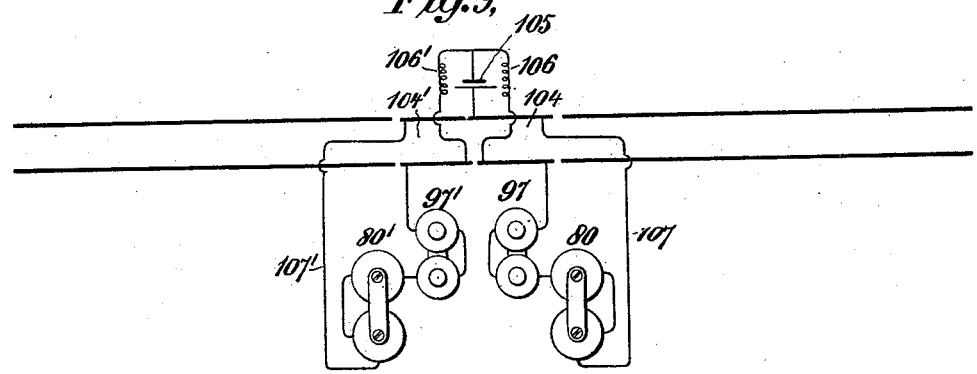
Figure 7:
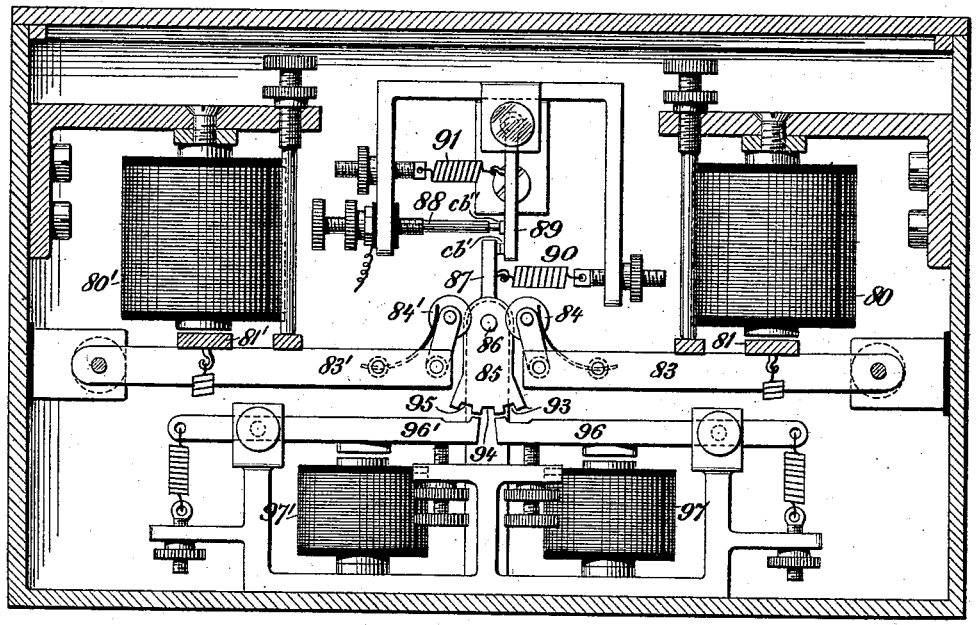
Figure 8:
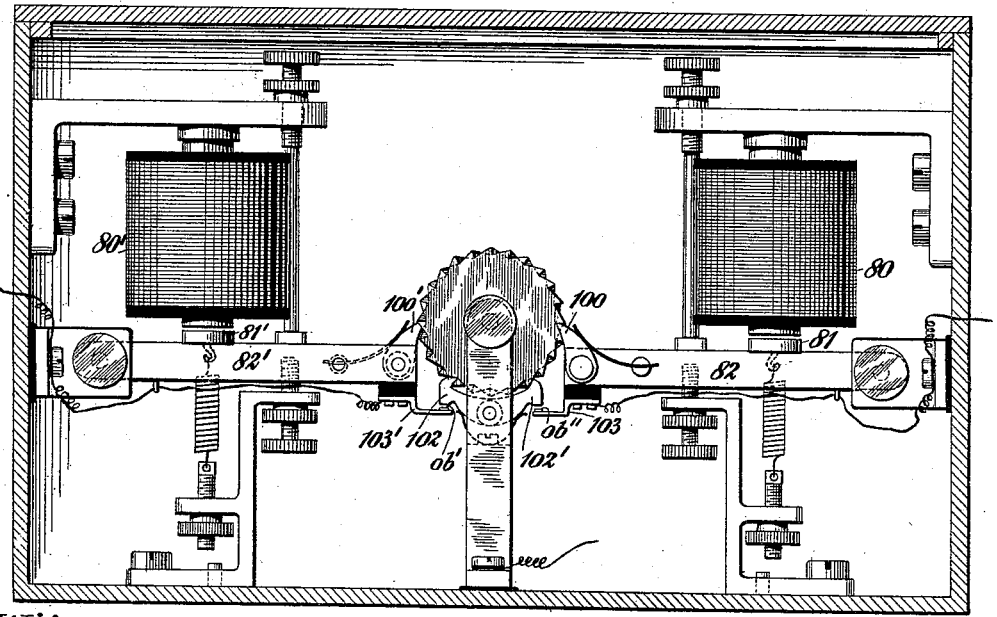

Figure 1 shows my registering system of signals applied to a short section of a single-track railway, and the circuits are arranged to provide for travel in both directions over this track. It also shows an application of this system to a single-point siding. Fig. 2 shows my registering system of signals applied to a section of a double-track railway, travel being ordinarily in one direction only over each track. Figs. 3 and 4 illustrate a register of my invention adapted for use in connection with the circuits of this system for automatically registering wheels of a train when they pass into a block and for canceling those wheels when they pass out of that block, this register forming the subject-matter of an application for Letters Patent filed on February 14, 1894, Serial No. 500,169. Fig. 3 is a side elevation of the register, and Fig. 4 is a transverse section taken on the irregular section line W W of Fig. 3. Figs. 5, 6, 7, 8, and 9 illustrate a track-instrument of my invention, which is adapted for operating the circuits and registers of this system, and which forms the subject-matter of an application for Letters Patent filed August 20, 1894, Serial No. 520,811. Fig. 5 is a plan view of the track-instrument, the hereinafter-mentioned registering-circuit contact-levers and the supports therefor, shown in Figs. 6 and 7, being omitted for the sake of clearness. Fig. 6 is a longitudinal section thereof taken on the irregular section line X X of Fig. 5, looking in the direction of the arrow there shown. Fig. 7 is a transverse section taken on the line Y Y of Fig. 5, looking in the direction of the arrow there shown, and illustrating particularly the mechanism for operating the hereinafter-mentioned registering-circuit contact-points of the track-instrument. Fig. 8 is an end view of the track-instrument mechanism, the mechanism shown in Fig. 7 being omitted for the sake of clearness, and shows the mechanism for operating the canceling-circuit contact-points of the track-instrument; and Fig. 9 is a diagram illustrating the arrangement of the circuits and insulated track-sections and the magnets of the track-instrument by which its mechanism is operated.

In the diagrams of my signal system, Figs. 1 and 2, each track-instrument is represented diagrammatically by two short insulated track-sections, with a battery connected therewith and conductors leading therefrom, between the ends of which conductors are placed the abbreviations "tr. in.," the track-instrument contact-points being shown in close proximity to the insulated track-sections. The track-sections thus represented are the tracksections numbered 104' and 104 in Fig. 9 of the drawings. Each register is diagrammatically represented by a group of three electromagnets, one placed above the other two, with a set of contact-points in close proximity to said magnets. The magnets thus represented are the operating magnets of the registering, canceling, and reverse canceling mechanisms of the register, and the contact-points are contact-points operated by the mechanism of the register, and which are separated so long as any wheels are recorded on the register.

The signals I have represented diagrammatically by electromagnets placed close to and parallel with the track. The magnets may be understood to represent the controlling magnets of electrically-controlled signals. The poles of the signal-magnets face in the direction in which the signals are supposed to face. These signals are arranged to be at "safety" when their controlling-magnets are energized and to be at "danger" when their controlling-magnets are de-energized.

So far as possible, in Figs. 1 and 2, I have placed upon one side of the track the circuits, track-instrument contact-points, registers, signals, and relays having to do with or operated by trains moving in one direction, and upon the other side of the track the circuits, track-instrument contact-points, registers, signals, and relays for the other direction of movement of trains.

In Figs. 1 and 2, I have also indicated by different kinds of lines the different classes of circuits which are used in my system. The full lines represent local circuits which are entirely within the signal-stations to which they belong and which directly control the home and distant signals passing through the contact-points of the registers and front relays. The dashed lines represent line-circuits which extend from signal-station to signal-station, and the function of which is to control the front signals of the block. These dashed-line circuits are the same in this system as in my other signaling system previously mentioned. The broken lines represent line-circuits which are connected to the canceling-magnets of the registers, and will therefore be termed "canceling-circuits." Their function is to operate the canceling mechanisms of the registers.

Fig. 1 shows, diagrammatically, a section of a single-track railway containing three signal-stations A, B, and C, the track from A to C constituting a signal-division, as explained in the specification of my previously-filed application for a signaling system, Serial No. 452,358. In this figure A is shown as the beginning of the line, and traffic in the direction from C to A is not supposed to extend beyond it, the signal-circuits being modified accordingly. The division from A to C is the first of a number of similar divisions, supposed to extend beyond C, which is the end station of the division A C and the first station of the division beyond C. At C is shown a single-point siding, with suitable signal connections, as will be hereinafter described.

Taking up the diagrams in detail and beginning at station A, Fig. 1, $x$ and $y$ are the track-rails, $a$ the track-instrument at station A, $a^2$ the home-signal at the entrance of the block, and $a^3$ the special front signal, the purpose and object of which was fully described in the specification of my other system, Serial No. 452,358. $a'$ is the governor which directly controls the various circuits, and from which they radiate. $ra'$ is the register, (shown in detail in Figs. 3 and 4,) of which 1 is the registering-magnet, 2 the canceling-magnet, 3 the reverse canceling-magnet, and 8 the contact-points of the register. $ca'$ is a normally-closed contact of track-instrument, $a$ being one of the registering circuit-contacts hereinafter mentioned in the description of the track-instrument, and is so operated that contact is broken each time that a pair of wheels passes over the track-instrument in the direction from A to B, and is closed again immediately after the passage of that pair of wheels and before the passage of following wheels.

The full-line circuits are as follows: From the positive pole of battery 4, through contact $ca'$ to 5, where the circuit divides, one branch going through the coils of registering-magnet 1 to 6, to 7, and to the negative pole of battery 4. The other branch from 5 goes through the contact-points 8 of register $ra'$ to 9, where the circuit again divides, one branch going through the magnet-coils of governor $a'$ to 6, and so back to battery. The other branch from 9 goes through the contact-points of front relay $a''$ and through the signal $a^2$ to 7, and so back to battery. The breaking of contact $ca'$ by the first pair of wheels of a train breaks these full-line circuits, operating the registering mechanism of register $ra'$, setting signal $a^2$ to "danger," and causing the armature of governor $a'$ to fall. The operation of the registering mechanism of register $ra'$ causes the separation of the register contact-points 8, as will be seen when the operation of the register is described, thereby breaking the full-line circuit permanently and preventing the raising of the armature of governor $a'$ when the contact $ca'$ is closed after the passage of the first wheel or pair of wheels over the track-instrument, thus retaining the signal $a^2$ at "danger." The register-contact 8 remains broken until by the action of the canceling-magnet 2, or reverse canceling-magnet 3, or both, as many wheels have been canceled as were registered at the time of the passage of the train into the block. When this has been done, the contact 8 is closed, the full-line circuit is thereby completed, the armature of governor $a'$ is raised, and the signal $a^2$ returns to "safety."

The full-line circuits of station B are the same as those of station A, except that there is a branch circuit from signal $b^2$, which passes through signal $b^1$ and then joins the return-wire, thus connecting signals $b^1$ and $b^2$ in multiple.

Considering now the broken line or canceling circuits, and beginning at station B, the circuit runs from the positive pole of battery 10, through the normally-open track-instrument contact-points $ob'$ to the first armature-contact of governor $b'''$, thence, if the armature be up, to 11, to 12 at station A, and through the canceling-magnet 2 of register $ra'$ to the third armature-contact of governor $a'$ and through that contact if the armature be down, to the broken-line circuit return-wire at 13, and so back to battery.

Contact $ob'$ is one of the canceling-circuit contacts hereinafter mentioned in the description of the track-instrument, and is so operated that contact is made each time that a wheel or pair of wheels passes completely over the track-instrument $b$ in the direction from B to C, and is broken again after the passage of that wheel and before the passage of the next wheel over the track-instrument. The circuit just described, therefore, it will be seen, is completed only when a train which has passed station A, and therefore has caused the armature of governor $a'$ to fall, passes station B and operates the contact-points $ob'$ of track-instrument $b$, and since contact $ob'$ is broken each time that a wheel passes over the track-instrument $b$ in the direction from B to C, each time operating the canceling mechanism 2 of the register $ra'$, each wheel as it passes over the track-instrument is canceled at register $ra'$.

If the train, after passing over track-instrument $a$, should back over the track-instrument again, the contact-points $oa''$, which are canceling-circuit contact-points of track-instrument $a$, similar to contact-points $ob'$ of track-instrument $b$, but are operated by trains moving in the reverse direction, will be closed by each wheel of the train as it passes over the track-instrument, and a circuit will be completed from battery 14 at station A through contact-points $oa''$ to the first armature-contact of governor $a'$, the armature of which is down, and through reverse canceling magnet 3 to the third armature-contact of governor $a'$ and through that contact to the broken-line-circuit return-wire at 13, and so back to battery, thus causing the operation of the reverse canceling mechanism of register $ra'$ and canceling each wheel as it passes over the track-instrument.

At station C the full-line circuits on the right side of the track are the same as those at station B. The broken-line circuits are changed slightly, however, owing to the presence of the siding at C. When a train passes onto the siding, it is necessary that it shall cancel as having passed out of the division A C, and therefore a track-instrument $d$ is placed on the siding beyond the fouling-point, and the canceling contact-points $od'$ are connected in multiple with the canceling contact-points $oc'$ of track-instrument $c$, so that the effect on the registers of the division A C is the same, whether contact-points $oc'$ or $od'$ are closed. Otherwise the canceling-circuits of station C are the same as those of station A.

The full-line circuits on the left side of the track at station C are the same as those at the other stations, except that the siding track-instrument contact-points $cd''$ are placed in series with the contact-points $cc''$ of track-instrument $c$, so that a train entering the division A C at C, either from beyond C or from the siding, will register the number of wheels that pass into the division.

All of the other circuits on the left side of the track are the same as those on the right side of the track, and need no further description.

The function of the dashed-line circuits is to set the front signals in advance of a train, and they are exactly the same as in my other system, described in my above-mentioned application, Serial No. 452,358. One circuit starts from battery 15, station A, goes through the second armature-contact of governor $a'$ to the signal $b^6$, thence through the magnet-coils of relay $b''''$ and through the second armature-contact of governor $b'$, if the armature be up, to the signal $c^6$, thence through the magnet-coils of relay $c''''$ to the dashed-line circuit return-wire and so back to battery.

If the armature of governor $b'$ be down, the circuit goes to the return-wire at 16, signal $c^6$ and relay $c''''$ being thus cut out, the signals $c^6$, $c^5$, and $c^4$ being therefore kept at "danger."

Another circuit for the other direction starts at battery 17, station C. Its function is to set the front signals for a train entering the division A C at C. Another circuit, belonging to the division beyond C, starts at battery 18, station C. Still another circuit belonging to the division beyond C, and corresponding to the circuit of battery 17, has in it the siding-signal $d^4$, the function and operation of which has been fully described in my above-mentioned application, Serial No. 452,358.

The register and track-instrument which operate the circuits of my system and are diagrammatically represented in Figs. 1 and 2, and which, as before stated, form the subject-matter of separate applications for Letters Patent, may now be described.

Taking up first the register and referring to Figs. 3 and 4, the magnets and contact-points of which are numbered to correspond with register $ra'$ of Figs. 1, 1, 2, and 3, are the operating magnets of the registering, canceling, and reverse canceling mechanisms, respectively. Each of these magnets operates a step-by-step mechanism acting on a ratchet-wheel mounted upon a revoluble shaft. These step-by-step mechanisms are all similar, except that the mechanism of magnet 1 is arranged to rotate its ratchet-wheel when the circuit of its magnet is broken, while the mechanisms of magnets 2 and 3 are arranged to rotate their respective ratchet-wheels when the circuits of their magnets are closed. 71 is the ratchet-wheel operated by magnet 1, and 73, Fig. 3, the ratchet-wheel operated by magnet 3, wheel 73 being directly in rear of and hidden by wheel 71 in Fig. 4, while wheel 71 is hidden in Fig. 3 by the framework supporting magnet 1.

The ratchet-wheels 71 and 73 are mounted on the same shaft 74, and are acted upon by their magnets in opposite directions, one magnet and step-by-step mechanism being arranged to rotate the shaft 74 in one direction, and the other magnet being arranged to rotate the shaft in the other direction. The ratchet-wheel of magnet 2 is hidden in Fig. 3 by the magnet. It is mounted upon a shaft 75, in line with shaft 74, and magnet 2 when operated turns shaft 75 in the same direction that magnet 1 turns shaft 74.

72, Fig. 4, is a stop-pawl engaging with the ratchet-wheel of magnet 2, and arranged to prevent the wheel from rotating backward.

The end of shaft 74 adjacent to shaft 75 overhangs its bearings, is insulated from the main portion of the shaft, and is screw-threaded. Upon the threaded portion is mounted a nut 76. Upon the shaft 75 is keyed a collar 77, and upon the shaft 74 is mounted loosely a collar 78. Two rods 79, upon opposite sides of the shaft 74, and only one of which is seen in Fig. 3, connect the collars 77 and 78, passing through loosely-fitting apertures in the nut 76. The nut 76 therefore rotates with, and only with, the shaft 75, though it is free to move longitudinally with respect to the shaft 74 when that shaft revolves.

Two engaging contact-points, one carried by an arm projecting from the shaft 74 and the other carried by the nut 76, together constitute the register-contact, as 8, which controls the signal-circuits in Figs. 1 and 2.

The operation of the register is as follows: When the magnet 1 is operated, as a wheel passes over a track-instrument, as $a$, Fig. 1, in the direction from A to C, the step-by-step mechanism operated by magnet 1 moves the wheel 71 and shaft 74 through the space of one tooth of the wheel 71. The magnet 2 not being operated, the shaft 75 and nut 76 remain stationary, except that the nut moves slightly to the right along the shaft 74 and the contact 8 is broken, setting to "danger" the signals. Successive wheels passing over the track-instrument and operating magnet 1 separate the contact-points 8 still farther, by a distance proportional to the number of wheels which pass into the block A B. When the wheels of the train, in passing out of the block A B at B, operate the canceling-circuit contact-points $ob'$ of the track-instrument $b$, and, through the dotted-line circuit, the canceling-magnet 2, the step-by-step mechanism operated by this magnet turns the shaft 75 and nut 76 in the same direction in which the shaft 74 was turned, thus tending to bring the contact-points 8 together. The number of teeth on the wheels of magnets 1 and 2 are exactly the same, so that when as many car-wheels have operated magnet 2 as first operated magnet 1, the contact-points will be together. It will be noted, also, that magnets 1 and 2 may be operating simultaneously and at the same or different speeds, without affecting the correctness of the registration and cancellation of the wheels by the register, so that one train may be entering the block A B at A while another train is passing out of the block at B without deranging the register. Should the train, after entering the block A B at A, back out of the block, passing again over track-instrument $a$, then, as will be seen when the operation of the track-instrument is described, canceling-circuit contact $oa''$ is operated by each wheel, operating reverse-canceling magnet 3 of the register, and so turning the wheel 73 and shaft 74 backward. The number of teeth on wheel 73 is the same as the number of teeth on wheel 72, so that when as many wheels have operated magnet 3 as first operated magnet 1 the contact 8 is again closed, the operation of magnet 3 having exactly the same effect on the contact-points of contact 8 that the operation of magnet 2 has. It will be noted that magnets 2 and 3 may be operated simultaneously, the shaft 74 turning backward while the nut 76 turns forward, both movements tending to bring the contact-points together, and the operation of the two canceling mechanisms being cumulative. This feature of the register makes it possible for trains to be passing out of the block at both ends simultaneously, just as it is possible for a train to enter at one end of the block while another train is passing out of the block. It is important that the register used in a registering system shall be capable of operating in this manner, because it frequently happens that even on roads where the absolute block system is used trains will overrun danger-signals to a greater or less extent, and unless the registers used be capable of operating in the manner above described derangement of the registers is likely to occur. Since the step-by-step mechanisms of magnets 1 and 3 oppose each other, and when operated act to revolve the same shaft 74 in opposite directions, the pawls of these mechanisms cannot be in engagement with their respective ratchet-wheels when their mechanisms are not operating, but each pawl must engage with its ratchet-wheel only when actually engaged in rotating that wheel and the shaft 74. This is accomplished by guards 79' engaging with these pawls and holding them out of engagement with the ratchet-wheels when the armature levers are up. When either armature-lever descends, its pawl swings into engagement with its ratchet-wheel and in the further movement of the lever rotates said wheel.

Referring now to Figs. 5, 6, 7, 8, and 9, which illustrate the track-instrument, the construction and operation of the track-instrument will be described. In these figures the contacts for controlling the registering and canceling circuits are lettered to correspond with track-instrument $b$, at station B. The track-instrument consists essentially of two separate and distinct mechanisms operated by the same electromagnets, one mechanism for operating the normally closed or registering contacts $cb'$ and $cb''$, (shown in Fig. 7,) and the other mechanism (shown in Fig. 8) for operating the normally open or canceling contacts $ob'$ and $ob''$. 80 and 80' are the electromagnets which operate these mechanisms. Both the registering-contact and the canceling-contact mechanisms are arranged to operate one contact when wheels moving in one direction pass over the track-instrument, and to operate another contact when wheels moving in the other direction pass over the track-instrument.

The armatures 81 and 81' of operating-magnets 80 and 80' are carried upon frames formed by pivoted levers 82 and 83 and 82' and 83' and suitable connecting cross-bars. Levers 83 and 83' carry friction-rollers 84 and 84', which are pressed against opposite sides of an arm 85, mounted upon and keyed to a revoluble shaft 86 by suitable springs. When either lever 83 or 83' descends, it causes the arm 85 to swing to one side or the other. Upon the shaft 86, but insulated therefrom, is mounted a contact-lever 87. Engaging with said contact-lever and with a contact-screw 88, likewise insulated from its support, is a contact-lever 89. The engaging contact-points of levers 87 and 89 constitute the registering-circuit contact $cb'$, and the engaging contact-points of screw 88 and lever 89 constitute the registering-circuit contact $cb''$, one contact being broken, as will be seen, when the arm 85 swings to the right and the other being broken when the arm swings to the left. Springs 90 and 91 are provided for holding the contact-points when neither lever 83 nor 83' is down, and suitable stop-screws are provided for limiting the upward movement of armature-levers 83 and 83'.

In the bottom of the swinging arm 85 are three notches 93, 94, and 95, separated by suitable projections or wards. Two pivoted locking-levers 96 and 96', carrying armatures of magnets 97 and 97', are adapted each to enter one of said notches when it is opposite the end of the lever and when the magnet of said lever is de-energized. Normally, as will be seen hereinafter, the circuits of these locking-magnets are closed and their armatures down; but when wheels pass over the track-instrument, first one and then the other magnet is de-energized.

Considering now the canceling circuit-contact mechanism, (shown in Fig. 8,) levers 82 and 82', which, as before stated, are attached to the armatures of magnets 80 and 80', carry pawls 100 and 100', which engage with corresponding ratchet-wheels 101 and 101', revolubly mounted but independent of each other. Each ratchet-wheel is likewise provided with a stop-pawl 102 or 102', which serves as a contact-lever, engaging each with a contact-strip 103' or 103, carried by the lever 82' or 82 of the other ratchet-wheel. The shape of these contact-strips is shown most clearly in Fig. 5. Stop-pawl 102 and contact-strip 103' together form canceling-circuit contact $ob'$, and pawl 102' and contact-strip 103 together form canceling-circuit contact $ob''$.

The circuits and insulated track-sections for operating the magnets of the track-instrument are shown diagrammatically in Fig. 9. There are in the track two insulated track-sections 104 and 104', to which are connected the poles of a battery 105, through resistance-coils 106 and 106'. Upon one side of the track the rails of these two rail-sections may be joined. The length of the track-sections may vary according as to whether it is desired in the system to register as units separate pairs of wheels, trucks, cars, or complete trains; but where, as will ordinarily be the case, the system will be adapted for registering separate pairs of wheels as units, the combined length of the two insulated rail-sections must not be as great as the distance between any two adjacent car-axles.

To the ends of rail-section 104 is connected a conductor 107, connected to magnets 97 and 80. To the ends of rail-section 104' is connected a conductor 107', connected to magnets 97' and 80'. These circuits, it will be seen, are normally closed through these magnets.

The operation of my track-instrument is as follows: When the first pair of wheels of a train pass upon one of the insulated rail-sections—say rail-section 104'—battery 105 is short-circuited through the axle, de-energizing magnets 97' and 80'. The armature 81', Fig. 7, of magnet 80' therefore falls, and the roller 84' swings pivoted arm 85 to the right, thus separating contact-levers 87 and 89 and breaking registering-circuit contact $cb'$. At the same time the locking-lever 96' is released by its magnet, and when the notch 95 of the arm 85 is opposite the end of this lever, the end of the lever enters the notch, thus holding the contact-levers apart. The circuit through magnets 97 and 80 is not affected when wheels enter track-section 104', since the resistance of coil 106' is sufficient to prevent total short-circuiting of battery 105. When the wheels pass upon track-section 104, magnets 97 and 80 are de-energized and magnets 97' and 80' are again energized. The armature of magnet 80' rises and the armature of magnet 97' falls; but before arm 85 can move, the lever 96 enters notch 94, again locking the arm 85, so that the descent of armature 81 does not change the position of the registering-circuit contact-points. When the wheels have passed off from rail-section 104, the armature 81 rises and the armature of magnet 97 falls, releasing the arm 85 and closing the contact $cb'$, so that the registering-contact mechanism is ready to be operated when another pair of wheels pass over the track-instrument in either direction.

It will be noted from the above description that the one registering-circuit contact or the other, according to the direction in which the train is moving, is broken the instant a pair of wheels passes on to one of the insulated track-sections, remains broken while that pair of wheels is on either of the insulated track-sections, and is closed again immediately after that pair of wheels has passed off from the insulated track-sections, so that even if the wheels should move but partly over the insulated track-sections and then should move back again, but one registering-circuit contact—the one first operated when the wheels passed upon the track-instrument track-sections—would be operated, and it is impossible that a single pair of wheels should operate a register twice or operate two registers in passing once onto or over the track-instrument.

When the first pair of wheels passes upon rail-section 104' and the armature of magnet 80' falls, the pawl 100' upon the end of lever 82', Fig. 8, is carried down through the space of one tooth of ratchet-wheel 101'. When this pair of wheels passes to rail-section 104, the armature of magnet 80, lever 82, and pawl 100 descend and the armature of magnet 80', lever 82', and pawl 100' rise, revolving the ratchet-wheel 101' through the space of one tooth and causing contact-pawl 102' to descend slightly as it passes over a tooth of the ratchet-wheel. The pawl 102' does not come in contact with contact-strip 103, its complementary contact-piece, however, as the lever 82, which carries that contact-strip, is down, and therefore contact $ob''$, the canceling-circuit contact, is not closed. When the wheels pass off from the track-section 104 and into the succeeding block, lever 82 rises, ratchet-wheel 101 is revolved through the space of one tooth, and contact-pawl 102 descends, making contact with contact-strip 103', since lever 82' is up, thus closing canceling-circuit contact $ob'$ for an instant and operating the canceling mechanism of the register connected therewith.

If a pair of wheels passes on to rail-section 104' and then, without moving on to rail-section 104, moves back again, register-contact $cb'$ is broken, as would be the case were the wheel to move on and completely over the track-instrument rail-sections; but since magnet 80 in this case is not de-energized its lever 82 does not fall, and when lever 82' rises contact $ob''$ is closed, thus operating the canceling-circuit for the reverse movement, the effect of which is, as will be seen when the operation of the circuits of Fig. 1 is described, to cancel the registration just produced by the operation of contact $cb'$. The same is true if the pair of wheels moves from rail-section 104' to 104 and then, without moving onward, moves back into rail-section 104', and so off from the track-instrument.

Having thus described the construction and operation of the registers and track-instru- ments used in my system, the operation of the circuits shown in Fig. 1 may now be described.

Supposing a train to enter the division A C at A, when the first wheel passes over track-instrument $a$ the contact $ca'$ is broken, thus causing the armatures of governor $a'$ and registering-magnet 1 to fall, thereby registering the passage of the wheel onto the division and breaking register-contact 8. Signal $a^2$ is also set to "danger," and the breaking of register-contact 8 retains it there and also prevents the raising of the armature of governor $a'$ when contact $ca'$ is again completed after the passage of the first wheel over the track-instrument. The armature of registering-magnet 1 is raised by the closing of contact $ca'$, however, so that it is in position to register the second wheel as it passes over the track-instrument. The fall of the armature of governor $a'$ breaks the dashed-line circuit of battery 15, thus setting to "danger" signal $b^6$, causing the fall of the armature of front relay $b''''$, thereby setting to "danger" signals $b^4$ and $b^5$, sets to "danger" signal $c^6$, and causes the fall of the armature of relay $c''''$, thereby setting to "danger" signals $c^4$ and $c^5$. The division is thus completely closed to all trains except the one which is just entering. When the second wheel of the train passes over track-instrument $a$, the contact $ca'$ is again broken, and the registering mechanism operated by registering-magnet 1 registers the passage of the second wheel of the train onto the block. Succeeding wheels are registered in the same manner. If after registering part or all of its wheels the train backs, then normally-open contact $oa''$ is closed each time that a wheel passes over track-instrument $a$, each time completing a circuit from battery 14 through contact $oa''$ to the first armature-contact of governor $a'$, the armature of which is down, through the reverse canceling-magnet 3, and through the third contact of governor $a'$ to battery, thus causing the canceling of each wheel as it passes over the track-instrument and out of the division. If the same number of wheels pass out of the division that passed into it, then when the last wheel passes out of the division register-contact 8 is closed, which completes the full-line signal-circuit, restoring to "safety" signal $a^2$ and raising the armature of governor $a'$, thereby completing the circuit of battery 15, and restoring to "safety" signals $b^6$, $b^5$, $b^4$, $c^6$, $c^5$, and $c^4$. The signals of the division are now in the same condition that they were before the train entered the division. Supposing, now, that the train again enters the division, as before, setting to "danger" signals $a^2$, $b^6$, $b^5$, $b^4$, $c^6$, $c^5$, and $c^4$, causing the armature of governor $a'$ to fall, and registering the number of wheels that enter, through the successive breaking and closing of contact $ca'$ and the operation of the register $ra'$, and supposing the train to pass on over the division A C to B, when it passes over track-instrument $b$ contact $cb'$ is broken and contact $ob'$ is closed each time that a wheel passes over the track-instrument. The breaking of the contact $cb'$ causes the fall of the armature of governor $b'$, thus setting to "danger" signals $b^1$ and $b^2$, and registers the wheels as they pass over the track-instrument, through the action of the registering mechanism of register $rb'$. The closing of contact $ob'$ complete a circuit from battery 10 through contact $ob'$ to the first armature-contact of governor $b'''$, the armature of which is up, through that contact to 11, to 12 at station A, through the canceling-magnet 2 of register $ra'$ and through the third armature-contact of governor $a'$, the armature of which is down, to the broken-line-circuit return-wire and so back to battery, thus canceling each wheel as it passes over track-instrument $b$, and, when the same number of wheels have been canceled that registered when the train passed onto the block A B, closing the register-contact 8, thus raising the armature of governor $a'$, restoring to "safety" signal $a^2$ and completing the circuit of battery 15 through the second contact of governor $a'$ and through signal $b^6$, the magnet-coils of relay $b''''$, and the second contact of governor $b'$, the armature of which is down, to 16, and so back to battery, thus restoring to "safety" signals $b^6$, $b^5$, and $b^4$. If desired, the train may now back again, since signls $b^6$, $b^5$, and $b^4$ are at "safety," in which case contact $cb''$ will be broken and contact $ob''$ closed when each wheel passes over the track-instrument, thus setting to "danger" signals $b^4$, $b^5$, $a^3$, and $a^2$, registering at register $rb''$ and canceling at register $rb'$, raising the armature of governor $b'$ and restoring to "safety" signals $b^1$, $b^2$, $c^6$, $c^5$ and $c^4$. Supposing, however, that the train passes on to station C, if it passes on over the main track it will set to "danger" signals $c^1$ and $c^2$ and the front signals of the division beyond C, and will register at register $rc'$ and cancel at register $rb'$, and when all the wheels have passed over track-instrument $c$ the register-contact of register $rb'$ will be closed, thus raising the armature of governor $b'$ and restoring to "safety" signals $b^1$, $b^2$, $c^6$, $c^5$, and $c^4$, thus clearing all the signals of the division and leaving the division open for another train. If instead of going past station C the train goes onto the siding at C, as it passes over siding track-instrument $d$ contact $od'$ will be closed each time that a wheel passes over the track-instrument and the canceling mechanism of register $rb'$ will be operated as before, and when all the wheels of the train have passed onto the siding the register-contact of register $rb'$ will be closed, thus restoring to "safety" signals $b^1$, $b^2$, $c^6$, $c^5$, and $c^4$, as before. When the train passes off from the siding, contact $cd''$ is broken each time that a wheel passes over track-instrument $d$ and the registering mechanism of register $rc''$ is operated as though the train had come from beyond C, thus setting to "danger" signals $c^4$, $c^5$, $b^3$, $b^2$, $b^1$, $a^3$, and $a^2$.

The operation of the signals and circuits for the direction from C to A is the same as that described for the direction from A to C and needs no further description.

The mechanism of my register is such that after the register contact-points are separated by the passage of a wheel or several wheels over the track-instrument by which the registering mechanism is operated these contact-points are not and cannot be brought together again until the canceling or reverse-canceling mechanism is first operated, so that the same number of wheels are canceled as were registered. If, now, while within a block a train breaks in two, one part remaining within the block and the other part passing out, the signals will not be returned to "safety" and cannot be returned to "safety" until the other portion of the train shall have passed out of the block. In like manner if the train shall stop over the track-instrument, part only having passed over it, the signals will not be returned to "safety" until the entire train shall have passed over the track-instrument and out of the block.

On roads where the permissive block system is in use it may and frequently will happen that a train will enter a block before a preceding train has left that block. In this case the register at the end of the block at which both of the trains entered will register a number of wheels corresponding to the sum of the number of wheels in the two trains, and the signals will not be returned to "safety" until the second train, as well as the first, has passed completely out of the block.

It will sometimes happen that a train within a block will be separated into two parts within the block, one part going out at one end of the block and the other part going out at the other end. It may also happen that both parts of the train may be leaving the block at the same time, so that the necessity of two canceling mechanisms in each register becomes apparent, as well as that these canceling mechanisms may operate simultaneously and that the number of wheels canceled shall be the sum of the number of wheels which operate the canceling mechanism and the number of wheels that operate the reverse-canceling mechanism—that is, shall be equal to the number of wheels registered when the train entered the block. It will likewise sometimes happen, where the permissive block system is in use, that one train will be leaving a block at the same time that a following train is entering the same block, so that the first train will cancel at the same time that the second train registers; but, as in the case just referred to, this condition is also fulfilled by my register, and one train may register while another cancels without either interfering with the other.

Referring now to Fig. 2, which, as before stated, shows my registering system of signals applied to a double-track railway, there are shown in this figure three signal-stations—L, M, and N. $x$ and $y$ are the rails of the right track, travel over which is ordinarily in the direction from L to N. $x'$ and $y'$ are the rails of the left track, travel over which is ordinarily in the direction from N to L. Considering now the circuits of this figure, and taking, for example, the signals and circuits of station M of the right track, $m^1$ and $m^2$ are respectively distant and home signals for station M, and $m_1$ is the track-instrument.

$m'$ is the governor, and $rm'$ the register, both of which are the same as the corresponding instruments of the single-track circuits, except as to the number and arrangement of the contact-points of the governor.

The full-line circuits are as follows: From the positive pole of battery 50, through normally-closed registering-circuit contact-points $cm'$ of track-instrument $m_1$, to 51, where the circuits divide, one branch going through the coils of the registering-magnet of register $rm'$ to 52, to 53, and thence to the negative pole of battery 50. The other branch from 51 goes through the register contact-points to 54, where the circuits divide, one branch going through the magnet-coils of the governor $m'$ to 52, and so back to battery. The other branch from 54 goes to 55, where it again divides, one branch going through signal $m^1$, the other branch going through signal $m^2$, the two branches uniting at 53, thus placing the signals in multiple and going to the negative pole of battery 50. It will be seen that this full-line circuit differs from the full-line circuit of the single-track railway only in that there is no provision made for passing the signal-circuit through the contact-points of a front relay—such as $a'''$ at station A. The function of the front relay is to permit of setting to "danger" the distant and home signals as front signals, and front signals are necessary and desirable only where travel is ordinarily in two directions over the track. For the same reason no dashed-line circuits are required. Considering now the broken-line or canceling circuits and beginning at station $M_1$, the circuit runs from the positive pole of battery 60 through normally-open canceling-circuit contact-points $om'$ of track-instrument $m^1$ to the canceling-magnet of the register $rl'$ at station L, and thence to the contact of governor $l'$, through that, if the armature be down, to the canceling-circuit return-wire at 61, and so back to battery. A reverse canceling-circuit goes from the positive pole of battery 60 through reverse-canceling contact-points $om''$ of track-instrument $m^1$ to the reverse-canceling-magnet of register $rm'$, thence to the armature-contact of governor $m'$, and through that contact, if the armature be down, to 62, and thence over the return-wire back to battery. While it is not considered necessary to provide signals for any exceptional and unusual reverse movement of a train on a double-track railway, which movements will sometimes occur, it is necessary to provide for canceling the wheels of the train in such reverse movement, in order that the rear signals which the train has set to "danger" when it entered the block may be returned to "safety" when it leaves the block. For this reason the reverse-canceling contact-points are provided.

The circuits at stations L and N are the same as those at station M. The circuits of the left track are the same as those of the right track and need no further description.

The operation of my registering system of signals, as applied to a double-track railway, is as follows: Supposing a train on the right track, going in the direction from L to N to pass station L, when the first wheel of the train passes over the track-instrument $l_1$ it breaks contact $cl'$ and closes contact $ol'$. The breaking of the contact $cl'$ causes the armature of the registering-magnet of register $rl'$ to fall, thereby registering the first wheel as having passed onto the block L M, causing the separation of the register contact-points, causing the fall of the armature of governor $l'$, and setting to "danger" signals $l^1$ and $l^2$. The closing of contact $ol'$ of the track-instrument $l_1$ will cause the operation of the canceling mechanism of the register at the station next behind L. Succeeding wheels will be registered and canceled in the same manner. When the train has passed on to station M, as the first wheel passes over the track-instrument $m_1$ it sets to "danger" signals $m^1$ and $m^2$, operates the registering mechanism of the register $rm'$, and causes the separation of the register contact-points and the fall of the armature of governor $m'$. The passage of the wheels of the train over the track-instrument will likewise operate the contact-points $om'$, each time completing a circuit from the positive pole of battery 60, through contact-points $om'$ to the canceling-magnet of register $rl'$, thence through the contact of governor $l'$, the armature of which is down, to 61, and thence over the return-wire of the canceling-circuit to the negative pole of battery 60. When all the wheels of the train have so canceled, the contact-points of the register $nl'$ will be brought together, completing the full-line circuit, raising the armature of governor $l'$ and restoring the signals $l^1$ and $l^2$ to "safety." In like manner, when the train passes over the track-instrument at station N, it sets to "danger" signals $n'$ and $n^2$ and will operate the registering mechanism of register $rn'$ and the canceling mechanism of the register $rm'$, and when all the wheels of the train have been canceled signals $m^1$ and $m^2$ will be restored to "safety." If, instead of passing on to station N, the train after passing partly or entirely over track-instrument $m_1$ should back again, then, in backing, each wheel of the train as it passes over the track-instrument will operate contact-points $om''$, completing a circuit from the positive pole of battery 60, through contact-points $om''$, through the reverse-canceling magnet of register $rm'$ and through the armature-contact of governor $m'$, the armature of which is down, to 62, and thence over the return-wire of the canceling-circuit to the negative pole of the battery. As soon as all the wheels that passed over the track-instrument when the train was moving forward have canceled for this backward movement the contact-points of the register will be brought together, the full-line circuit thereby completed, and the signals $m^1$ and $m^2$ restored to "safety."

In the circuits of both Figs. 1 and 2, instead of using metallic return-conductors between signal-stations, the wires may be grounded, thus using the earth as a return-conductor.

I do not limit myself to the use of the particular register and track-instrument herein described with the circuits of my system, but may use any other register and track-instrument capable of operating the circuits in a similar manner.

Having thus completely described my invention, what I claim, and desire to secure by Letters Patent, is—

1. In an electrical railway signaling system, the combination, with two or more consecutive blocks or sections of track, a track-instrument at the entrance of each block, and a register for each block provided with registering and canceling mechanisms, capable of simultaneous and independent operation of a separate registering circuit for each register controlling the registering mechanism of that register and operated by the track-instrument at the entrance of the block to which that register belongs, a separate canceling circuit for each register controlling the canceling mechanism of that register and operated by the track-instrument at the entrance of a succeeding block, and batteries or other sources of electrical energy for said circuits, substantially as described.

2. In an electrical railway signaling system, the combination, with a block or section of track and a register therefor having registering and canceling mechanisms, capable of simultaneous and independent operation of a track-instrument at the entrance of said block and a registering circuit for controlling the registering mechanism operated thereby, a track-instrument at the exit to said block and a canceling circuit for controlling the canceling mechanism operated thereby, batteries or other sources of electrical energy for said circuits, and means for preventing the operation of said canceling circuit by a train from within the block to which the register belongs when no train is recorded at said register, substantially as described.

3. In an electrical railway signaling system, the combination, with a block or section of track and a register therefor having registering and canceling mechanisms, of a track-instrument at the entrance of said block and a registering circuit for controlling the registering mechanism operated thereby, a track-instrument at the exit to said block and a canceling circuit for controlling the canceling mechanism operated thereby, and contact points controlling said canceling circuit and operated through the action of the registering and canceling mechanisms of said register, and adapted to prevent the operation of the canceling circuit when no train within the block is recorded at said register, substantially as described.

4. In an electrical railway signaling system the combination, with a block or section of track and a register therefor having registering and canceling mechanisms, of a track-instrument at the entrance of said block and a registering circuit for controlling the registering mechanism operated thereby, a track-instrument at the exit to said block and a canceling circuit for controlling the canceling mechanism operated thereby, register contact points normally closed when no train is recorded at said register but arranged to be separated when a train is recorded at said register, a governor or relay and a normally closed governor circuit passing through said register contact points and controlling said governor, contact points of the governor through which the canceling circuit passes and which are normally separated but are brought together by the fall of the governor armature, thereby preventing the operation of the canceling mechanism, and batteries or other sources of electrical energy for said circuit, substantially as described.

5. In an electrical railway signaling system the combination, with a block or section of track A B, track-instruments $a$ and $b$ at the entrance and exit to said block respectively, and a register $ra'$ for said block having registering and canceling mechanisms, of a registering circuit passing through the registering magnet 1 and through contact points $ca'$ of track-instrument $a$, a canceling circuit passing through the canceling magnet 2 and through contact points $ob'$ of track-instrument $b$, register contact points 8 normally closed when no train is recorded at said register and arranged to be separated when a train is recorded at said register, a relay or governor $a'$ and a normally closed governor circuit passing through said register contact points 8, contact points of the governor through which said canceling circuit passes and which are normally separated but are brought together by the fall of the governor armature, and batteries or other sources of energy for said circuits, substantially as described.

6. In an electrical railway signaling system, the combination, with a block or section of track and track-instruments at the ends of said block, of a register for one end of said block, having registering and canceling mechanisms capable of simultaneous and independent operation and a reverse canceling mechanism capable of operating simultaneously with and independently of said canceling mechanism, suitable connections between the registering and reverse canceling mechanism and the track-instrument at the same end of the block, whereby the registering and reverse canceling mechanisms are operated by the home track-instrument, and other suitable connections between the canceling mechanism and the track-instrument at the other end of the block, whereby said canceling mechanism is operated by the distant track-instrument, substantially as described.

7. In an electrical railway signaling system, the combination, with a block or section of tracks, as A B, and track-instruments $a$ and $b$ at the ends of said block, of a register $ra'$ for one end of said block having registering and canceling mechanisms capable of simultaneous and independent operation and a reverse canceling mechanism capable of operating simultaneously with and independently of said canceling mechanism, registering and reverse canceling circuits connecting said registering and reverse canceling mechanisms with track-instrument $a$, whereby said registering and reverse canceling mechanisms are operated by the home track-instrument, and a canceling circuit connecting said canceling mechanism with track-instrument $b$, whereby said canceling mechanism is operated by the distant track-instrument, substantially as described.

8. In an electrical railway signaling system, the combination, with a block or section of track and track-instruments at the ends of said block, of a register for one end of said block, having registering and canceling mechanisms capable of simultaneous and independent operation and a reverse canceling mechanism capable of operating simultaneously with and independently of said canceling mechanism, suitable connections between the registering and reverse canceling mechanisms and the track-instrument at the same end of the block, whereby the registering and reverse canceling mechanisms are operated by the track-instrument at the home end of the block, other suitable connections between the canceling mechanism and the track-instrument at the other end of the block, whereby the canceling mechanism is operated by the distant track-instrument, and signal controlling devices operated by said register, substantially as described.

9. In an electrical railway signaling system, the combination, with a block or section of track and a register therefor having registering and canceling mechanisms capable of simultaneous and independent operation and a reverse canceling mechanism capable of operating simultaneously with and independently of said canceling mechanism, and track-instruments at the ends of said block for operating said register, of a registering circuit for controlling the registering mechanism operated by the track-instrument at the entrance of said block, a canceling circuit for controlling the canceling mechanism operated by the track-instrument at the exit to said block, a reverse canceling circuit for controlling said reverse canceling mechanism operated by the track-instrument at the entrance of said block, batteries or other sources of electrical energy for said circuits, and means for preventing the operation of said canceling circuits when no train within the block is recorded at said register, substantially as described.

10. In an electrical railway signaling system, the combination, with a block or section of track, as A B, track-instruments *a* and *b* at the entrance and exit to said block respectively, and a register *ra'* for said block having registering and canceling mechanisms capable of simultaneous and independent operation and a reverse canceling mechanism capable of operating simultaneously with and independently of said canceling mechanism, of a registering circuit passing through contact points *ca'* of track-instrument *a*, a canceling circuit passing through the canceling magnet 2 and through the registering magnet 1 and through contact points *ob'* of track-instrument *b*, a reverse canceling circuit passing through the reverse canceling magnet 3 and through contact points *oa"* of track-instrument *a*, batteries or other sources of electrical energy for said circuits, and means for preventing the operation of said canceling and reverse canceling circuits when no train within the block is recorded at said register, substantially as described.

11. In an electrical railway signaling system, the combination, with a block or section of track, as A B, track-instruments *a* and *b* at the entrance and exit to said block respectively, and a register *ra'* for said block having registering, canceling, and reverse canceling mechanisms, of a registering circuit passing through the registering magnet 1 and through contact points *ca'* of track-instrument *a*, a canceling circuit passing through the canceling magnet 2 and through contact points *ob'* of track-instrument *b*, a reverse canceling circuit passing through the reverse canceling magnet 3 and through contact points *oa"* of track-instrument *a*, register contact points 8 normally closed when no train is recorded at the track-instrument and arranged to be separated when a train is recorded at said register, a relay or governor *a'* and a normally closed governor circuit passing through said register contact points 8 and controlling the governor, and contact points of the governor through which pass the canceling and reverse canceling circuits, and which are normally separated, but are brought together by the fall of the governor armature, substantially as described.

12. In an electrical railway signaling system, the combination, with a block or section of track, a register therefor having registering and canceling mechanisms, and suitable signals for said block adapted to be controlled through the action of said register, of a track-instrument at the entrance of said block and a registering circuit for controlling the registering mechanism operated thereby, a track-instrument at the exit to said block and a canceling circuit for controlling the canceling mechanism operated thereby, register contact points normally closed when no train is recorded at the register but arranged to be separated when a train is recorded at said register, a governor or relay, and a normally closed governor circuit passing through said register contact points and controlling said governor, contact points of the governor through which the canceling circuit passes and which are normally separated but are brought together by the fall of the governor armature, thereby preventing the operation of the canceling mechanism when no train is recorded at said register, a normally closed signal circuit for operating the signals of said block controlled by said register contact points, and adapted to hold said signals at danger when said register contact points are separated, and batteries or other sources of electrical energy for said circuits, substantially as described.

13. In an electrical railway signaling system, the combination, with a block or section of track, a register therefor having registering and canceling mechanisms capable of simultaneous and independent operation and a reverse canceling mechanism capable of operating simultaneously with and independently of said canceling mechanisms, and signals for said block adapted to be controlled through the action of said register, of a track-instrument at the entrance of said block and a registering circuit operated thereby for controlling the registering mechanism, a track-instrument at the exit to said block and a canceling circuit operated thereby for controlling the canceling mechanism, and a reverse canceling circuit operated by the track-instrument at the entrance of said block for controlling the reverse canceling mechanism and circuit, register contact points operated by said registering, canceling, and reverse canceling mechanisms, a signal circuit operated thereby for controlling the signals of said block, and batteries or other sources of electrical energy for said circuits, substantially as described.

14. In an electrical railway signaling system, the combination, with a section of track, as A C, divided into blocks, as A B and B C, registers, as *ra'* and *rb"* for each block corresponding to each direction of movement of trains over that block and adapted to register the passage of trains into and out of said block, and track-instruments at the ends of said blocks for operating said registers, of relays or governors, as *a'* and *b'''*, for each block, corresponding to each direction of movement and controlled each by the corresponding register of that block, front relays as *a"* and *b''''* for each block corresponding to each direction of movement, a front signal battery, as 15, for each direction of movement and a circuit therefor passing through contact points of the governors for one direction of movement, as *a'* and *b'*, and through the magnets of the front relays for the other direction of movement, as $b''''$ and $c''''$, signals for each direction of movement for each block and local signal circuits and batteries therefor for operating said signals, controlled each by the corresponding register of that block and by the front relay of that block corresponding to the opposite direction of movement, substantially as described.

15. In an electrical railway signaling system, the combination, with a block or section of track, as B C, provided with a side or auxiliary track, registers $rb'$ and $rc''$ for registering the passage of trains into and out of said block, having registering and canceling mechanisms capable of operating simultaneously and independently, track-instruments $b$ and $c$ at the ends of said block having contact points $cb'$ and $cc''$ and registering circuits passing through and connected to the registering mechanisms of registers $rb'$ and $rc''$ respectively, for operating the registering mechanisms of said registers when trains pass into said block, and having contact points $ob''$ and $oc'$ and canceling circuits passing therethrough and connected to the canceling mechanisms of registers $rc''$ and $rb'$, respectively, for operating the canceling mechanisms of said registers when trains pass out of said block, of a siding track-instrument $d$ having contact point $od'$ and a canceling circuit passing therethrough and connected to the canceling mechanism of register $rb'$, adapted to operate the canceling mechanism of register $rb'$ when a train passes from block B C on to the siding, and contact points $cd''$ and a registering circuit passing therethrough and connected to the registering mechanism of register $rc''$, for operating the registering mechanism of register $rc''$ when a train passes from the siding into the block B C, substantially as described.

In testimony whereof I affix my signature in presence of two witnesses.

THOS. B. DIXON.

Witnesses:
H. M. MARBLE,
J. ALEX. STITT.